United States Patent [19]

Kobayashi

[11] Patent Number: 4,487,731

[45] Date of Patent: Dec. 11, 1984

[54] PROCESS AND APPARATUS FOR PRODUCING FOAMED SYNTHETIC RESIN BODIES

[75] Inventor: Osamu Kobayashi, Osaka, Japan

[73] Assignee: Kanegafuchi Kagaku Kogyo Kabushiki Kaisha, Osaka, Japan

[21] Appl. No.: 537,832

[22] Filed: Sep. 30, 1983

[30] Foreign Application Priority Data

Oct. 2, 1982 [JP] Japan ................. 57-173787

[51] Int. Cl.³ .......................... B29D 27/00
[52] U.S. Cl. ..................... 264/51; 264/101; 264/148; 264/334; 425/377; 425/817 C; 425/DIG. 60; 425/308
[58] Field of Search ............... 264/53, 51, 101, 334, 264/148; 425/377, 817 C, DIG. 60, 308

[56] References Cited

U.S. PATENT DOCUMENTS

| | | | |
|---|---|---|---|
| 3,647,329 | 3/1972 | Reipenhauser et al. | 264/53 X |
| 3,798,337 | 3/1974 | Abalo | 264/101 X |
| 3,822,331 | 7/1974 | Cogliano | 264/101 X |
| 4,199,310 | 4/1980 | Phipps | 425/71 |
| 4,284,596 | 8/1981 | Inokuchi et al. | 264/101 X |

FOREIGN PATENT DOCUMENTS

| | | |
|---|---|---|
| 36-18779 | 5/1961 | Japan . |
| 55-2045 | 9/1980 | Japan . |
| 1233088 | 5/1971 | United Kingdom ........ 264/101 |

*Primary Examiner*—Philip Anderson
*Attorney, Agent, or Firm*—Maky, Renner, Otto & Boisselle

[57] ABSTRACT

A process for producing a foamed synthetic resin body comprising continuously extruding a foamable thermoplastic resin extrudate composition from an extruder die into a reduced pressure zone, subjecting the extrudate to an expansion molding step, a cooling-hardening step and a cutting step while transporting the extrudate through the reduced pressure zone to obtain a foamed piece of predetermined length, shutting off a portion of the reduced pressure zone surrounding the foamed piece from the other portion thereof when the foamed piece has reached a specified position to restore the foamed piece surrounding portion to a normal pressure, subsequently discharging the foamed piece into the atmosphere, and thereafter bringing the surrounding portion into communication with the reduced pressure zone again upon reducing the pressure. Foamed resin bodies of desired expansion ratio and shape can be prepared continuously with high cooling efficiency. An apparatus for practicing the process is also disclosed. Such apparatus includes means to form a continuous length of extrudate within a vacuum chamber and means to cut the extrudate to length and means to pass the cut extrudate into a second chamber, and then to cause the cut length to exit the second chamber without affecting the reduced pressure in the chamber or reduced pressure zone.

42 Claims, 2 Drawing Figures

PROCESS AND APPARATUS FOR PRODUCING FOAMED SYNTHETIC RESIN BODIES

BACKGROUND OF THE INVENTION

1. Field of the Invention

The present invention relates to a process and apparatus for producing foamed bodies of thermoplastic synthetic resin by extruding a foamable thermoplastic synthetic resin from a die provided in front of an extruder, foaming the extrudate to a desired shape in a reduced pressure zone and delivering the foamed body into the atmosphere continuously.

2. Description of the Prior Art

Foamed bodies of thermoplastic synthetic resin are produced generally by injecting a blowing agent into a molten resin within an extruder, cooling and kneading the mixture in the extruder to prepare a uniform composition having a melt viscosity suitable for foaming and extruding the composition from a die into the atmosphere to foam the molten thermoplastic resin by virtue of the difference between the vapor pressure of the blowing agent and the atmospheric pressure.

Foamed bodies prepared by such a conventional process usually have an expansion ratio of about 1.5 to about 38 times. Those foamed or expanded to ratios higher than the above-mentioned range are almost of little or no commercial value, for example, because they have an open cellular structure, are uneven in cell diameter and are prone to shrinkage, warping or the like. The conventional process has another drawback in that the use of an increased amount of blowing agent entails a higher material cost if it is desired to obtain products with high expansion ratios even within the above range, for example, with expansion ratios of about 36 to about 38 times.

To overcome these problems, attempts have been made to improve the expansion efficiency by extruding a foamable synthetic resin into a reduced pressure zone as proposed in Japanese Patent Examined Publication No. 18779/1961 and Japanese Published Unexamined Publication No. 2045/1980 and U.S. Pat. No. 4,199,310. However, I have made detailed investigations into these proposals and found that they have the following drawbacks.

Japanese Patent Examined Publication No. 18779/1961 proposes a technique which employs an expansion molding apparatus disposed in front of the die of an extruder, having a space conforming in cross section to the shape of the product, and formed in its inner surface with a large number of ports in communication with a gas discharge device. With this technique, a molten synthetic resin having a blowing agent incorporated therein is continuously extruded into the apparatus and subjected to expansion molding while being passed through the interior of the apparatus which is maintained at a reduced pressure by suction acting through the large number of ports. With this process, the maintenance of the reduced pressure within the expansion molding apparatus is dependent on the state of intimate contact between the foamed resin and the wall surface of the apparatus. However, if it is attempted to produce foamed bodies of different specifications involving different specific gravities with use of expansion molding apparatus having an identical configuration, the optimum values of extrusion molding conditions, such as the amount of blowing agent, temperature of resin, reduced pressure within the die, etc., differ from specification to specification, with the result that the resin tends to foam in varying modes to alter the state of intimate contact between the foamed resin and the wall surface of the apparatus until the operation stabilizes under proper conditions.

This varies the internal reduced pressure of the apparatus, giving rise to variations in the quality of the product. Furthermore, the technique not infrequently involves the need to selectively use an expansion molding apparatus which is designed and fabricated in accordance with the grade or specifications of a particular product every time such specifications are changed. Thus the proposed technique is very disadvantageous economically as an industrial technique.

The invention disclosed in Japanese Published Unexamined Publication No. 2045/1980 relates to a technique which employs a sizing apparatus comprising a sizing cylinder defining a reduced pressure zone, a sealing member provided at the forward end of the cylinder for closing the zone and a cooling water channel externally surrounding the cylinder. With this technique, a prefoamed body of foamable thermoplastic resin composition is extruded into the sizing cylinder, further expanded in the reduced pressure zone within the cylinder and hardened by cooling.

The invention nevertheless has basic technical defects in the method of cooling the foamed body, and in the expansion molding process when producing an article of hollow cross section. The foamed body cooling method is dependent on the transfer of radiant heat resulting from the difference between the temperature of the foamed body and the lower temperature of inner wall surface of the sizing cylinder which is obtained by passing cooling water through the jacket around the apparatus. Consequently the method is very low in cooling efficiency and has the disadvantage that the sizing apparatus has an unjustifiably increased length and requires a larger area for installation because the length of the apparatus is determined by the cooling effect which is irrelevant to the essential feature of the technique, i.e., the production and maintenance of the reduced pressure. Further when producing a foamed body of hollow cross section, the inside hollow portion of the body is subjected to the atmospheric pressure at all times owing to the characteristics of the means used in the technique for sealing off the reduced pressure zone. This entails the drawback that the product differs in cell diameter between the inside of the product and the outside thereof. The process has another drawback in that the outside shape of the product is dependent largely on the atmospheric pressure to which the product is exposed at the inside.

The technique disclosed in U.S. Pat. No. 4,199,310 resides essentially in the maintenance of reduced pressure within an expansion molding appartus by a water seal. As compared with conventional processes, the disclosed technique has the drawback of necessitating a greatly increased area for the installation of the apparatus and requiring a take-up unit of much larger capacity as installed in a vacuum. The above drawback is attributable chiefly to the fact that since the foamed body is held submerged at all times during production, the buoyancy of the body increases greatly with an increase in the size or expansion ratio of the body desired, and also to the fact that there must be an approximately 10-meter difference in elevation between the extruder and the finishing means in order to obtain a required degree of vacuum.

SUMMARY OF THE INVENTION

To solve the foregoing problems involved in the prior art, I have conducted intensive research and consequently accomplished the present invention. The object of the invention is to produce a desired foamed resin product of optional expansion ratio and optional shape continuously and economically advantageously at a reduced pressure.

Stated specifically the invention provides a process characterized by continuously extruding a foamable thermoplastic resin from the die of an extruder into a reduced pressure zone, subjecting the extrudate to an expansion molding step, a cooling-hardening step and a cutting step while transporting the extrudate through the reduced pressure zone to obtain a foamed piece of a predetermined length, shutting off a portion of the reduced pressure zone surrounding the foamed piece from the other portion thereof when the foamed piece has reached a specified position to restore the foamed piece surrounding portion to a normal pressure, subsequently discharging the foamed piece into the atmosphere, and thereafter bringing the foamed piece surrounding portion into communication with the reduced pressure zone again upon reducing pressure. The above process of the invention can be practiced very advantageously with use of the apparatus of the invention to be described below with reference to the accompanying drawing. Such apparatus comprises a chamber at reduced pressure into which an extrudate is extruded to form a continuous length of foamed extrudate, characterized by means operative to cut the extrudate to length within said chamber, and means then to pass the cut length into a second chamber also at such reduced pressure, and means to cause the cut length to exit the second chamber without affecting the reduced pressure within the first mentioned chamber.

To the accomplishment of the foregoing and related ends, the invention, then comprises the features hereinafter fully described and particularly pointed out in the claims, the following description and the annexed drawings setting forth in detail a certain illustrative embodiment of the invention, this being indicative, however, of one of the various ways in which the principals of the invention may be employed.

DESCRIPTION OF THE PREFERRED EMBODIMENT

Figure 1:
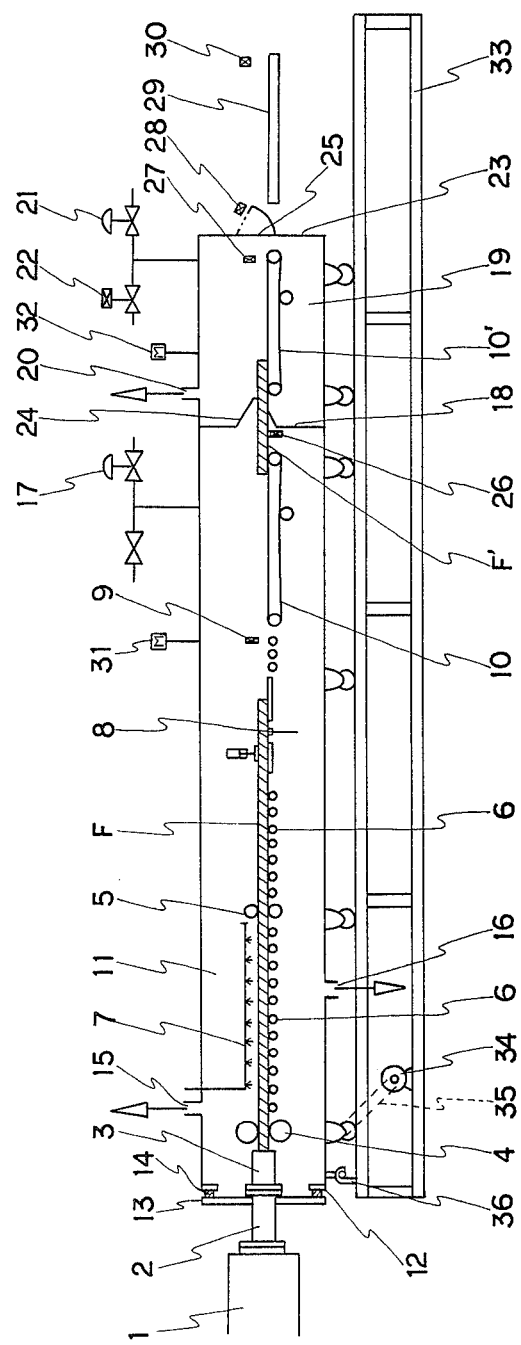
FIG. 1 is a schematic side elevation showing an embodiment apparatus of the invention; and, FIG. 2 is a schematic side elevation showing another embodiment apparatus of the invention.

FIG. 1 shows an extruder 1 for a foamable thermoplastic resin which has a die 2 attached to its outer end. A sizing die 3 is further connected to the die 2.

Disposed in the vicinity of the outlet of the sizing die 3 is a take-up unit 4 comprising a pair of drive rolls for nipping a foamed body F extruded from the die. Tension rolls 5 comprising a pair of nipping drive rolls for similarly holding the foamed body F therebetween are arranged to the rear of the take-up unit 4 at a suitable distance therefrom. While rubber rolls, each comprising a metal roll coated with natural rubber, synthetic rubber or a composite material of these rubbers, are suitable for the take-up unit 4 and the tension rolls 5, apron roll means comprising rubber belts or the like are also usable.

A conveyor 6 extends from the take-up unit 4 to a location further to the rear of the tension rolls 5 for transporting the foamed body F. Advantageously the conveyor 6 is a roller conveyor which comprises a multiplicity of idler rolls supported horizontally across the path of advance of the foamed body F at right angles thereto, but a usual belt conveyor or net conveyor is of course usable.

A water applicator duct 7 extends above, and along the axis of, the foamed body F transported from the take-up unit 4 and further between the tension rolls 5 and is connected to a cooling water supply source (not shown).

Preferably the water applicator duct 7 is in the form of perforated pipe having a large number of orifices, or of the sprinkler or atomizer type having spray nozzles. Another water applicator duct may be provided co-jointly with the duct 7 for spraying water onto the foamed body F from therebelow upward.

A cutter 8 is provided in the vicinity of the rear end of the conveyor 6 across the path for the foamed body. Any of known or conventional means, such as a circular saw, knife cutter or leather cutter, is usable as the cutter 8. A length sensor 9 comprising a photoelectric tube or the like is disposed to the rear of the cutter 8 at a specified distance therefrom for actuating the cutter 8 upon sensing the foamed body F.

Disposed to the rear of the conveyor 6 subsequent thereto are conveyors 10 and 10', such as endless belt conveyors or roller conveyors, which are arranged in series.

Although the apparatus comprising the series of devices including the extruder 1 through the conveyor 10 and described above is not much different from those heretofore used for extrusion foaming, one of the most distinctive features of the apparatus of the invention is that at least the sizing die 3 and the subsequent devices in the above-mentioned series are accomodated in an airtight vacuum chamber 11.

A seal plate 12 or bulkhead at the edge of the front end of the vacuum chamber 11 and a seal plate 13 having the die 2 inserted therethrough are fixedly connected together, with a packing 14 interposed therebetween, to hold the chamber 11 airtight, with the above-mentioned devices for extrusion foaming housed therein. The vacuum chamber has a gas vent 15 communicating with the vacuum pump (not shown), a drain port 16 communicating with a cooling water discharge pump (not shown), and a pressure control valve 17 for adjusting the degree of vacuum within the chamber.

Another most distinctive feature of the apparatus of the present invention is that the apparatus is provided with an arrangement for delivering a cut foamed body, namely, a foamed piece F', from the vacuum chamber 11 while maintaining the chamber in a vacuum.

More specifically, a pressure restoring compartment or chamber 19 separated by a partition 18 is formed in the rear-most portion of the vacuum chamber 11. The pressure restoring compartment or chamber 19 has the conveyor 10' housed therein and is provided, independently of the vacuum chamber 11, with a gas vent 20 communicating with a vacuum pump (not shown), a pressure control valve 21 and a vacuum breaker valve 22 for producing a reduced pressure, adjusting the reduced pressure level and vitiating the vacuum independently of the vacuum chamber 11. The pressure restoring compartment or chamber 19 further has openable inlet gate 24 and outlet gate 25 on the partition 18 and on its rear end wall 23, respectively. Preferably the gates 24 and 25 each comprise a swing damper for hermetically sealing off the compartment. The apparatus has an inlet gate position sensor 26 outside the inlet gate 24 and a product position sensor 27 in the vicinity of the rear end of the conveyor 10' for detecting the position of the product. Arranged outside the outlet gate 25 are an outlet gate position sensor 28, a table 29 for receiving the product delivered from the outlet gate 25 and a delivery sensor 30 for detecting the product transferred onto the table 29. The vacuum chamber 11 and the pressure restoring compartment or chamber 19 are further provided with reduced pressure sensors 31 and 32, respectively, for measuring the reduced pressure levels of the chamber and compartment. The inlet gate 24 and the outlet gate 25 are opened and closed, the foamed piece F' is transported into and out of the pressure restoring compartment, and a vacuum is generated and broken in the compartment or chamber 19 in accordance with the specified procedure to be described later, while detecting with these sensors the position of the foamed piece F' outside and inside of the pressure restoring compartment or chamber 19 with each other in respect of air pressure or degree of vacuum, whereby the foamed piece F' is delivered from the pressure restoring compartment, with the vacuum chamber maintained in a vacuum. Most preferably, the gate opening and closing movement, the increase and decrease of the air pressure, delivery of the foamed piece, etc. are effected by power sources provided for these movements and operation, by automatically actuating the power sources according to a predetermined program in response to foamed piece position detecting signals and air pressure comparing signals from the above sensors.

The apparatus of the invention of the type wherein the vacuum chamber 11 and the pressure restoring compartment or chamber 19 are joined together as a unit as described is supported at its bottom by wheels on a base 33. The wheels are rotated by a motor 34 fixed to the base 33 through a belt, chain or like power transmission means 35 to move the apparatus horizontally. The present apparatus, when operated in combination with the extruder 1, is fixed to the base 33 by engagement with fixing means 36.

Although swing dampers are used as the inlet gate 24 and outlet gate 25 in the illustrated embodiment, doors of any type are usable provided that the compartment can be held airtight. While valves utilizing the modulus of elasticity of a spring are generally useful as the pressure control valves 17, 21 and the vacuum breaker valve 22, valves of any type are of course usable insofar as they have similar functions.

Next, the operation of the present apparatus and the process of the invention will be described below.

First, the vacuum chamber 11 is set to the desired level of reduced pressure by adjusting the amount of gas to be discharged by the vacuum pump through the gas vent 15, in balance with the amount of air to be admitted through the pressure control valve 17. Further the reduced pressure level of the pressure restoring compartment or chamber 19 is set to the desired value by a balance between the amount of gas to be discharged by the vacuum pump through the gas vent 20 and the amount of air to be admitted through the pressure control valve 21. The reduced pressure level thus established is maintained by the packing 14 and the outlet gate 25 in its closed position.

A thermoplastic resin formulated into a uniform foamable composition is extruded from the die 2 of the extruder 1 into the vacuum chamber 11. The thermoplastic resin extrudate starts and completes foaming efficiently within the reduced pressure zone which is maintained at the specified pressure level, and is molded into a foamed body F while being drawn through the sizing die 3 by the take-up unit 4. The foamed body F obtained is transported on the conveyor 6 while being longitudinally tensioned by the tension rolls 5. During travel, the foamed body is brought into contact with cooling water sprinkled from the water applicator duct 7 and hardened by being cooled to a temperature below the softening point of the resin used. The cooling water is led through the drain port 16 to the water discharge pump and released to a location under the atmosphere. This method of hardening the foamed body by cooling achieves efficient cooling, remarkably improves the dimensional accuracy of the cross sectional profile of the foamed body and is therefore very desirable. The foamed body F thereafter reaches the cutter 8, whereby it is cut to a foamed piece F' of a predetermined length as specified by the length sensor 9. The foamed piece F' is transported into the pressure restoring compartment 19 by the conveyor 10. At this time, the vacuum chamber 11 is equivalent to the pressure restoring compartment 19 in reduced pressure level, with the inlet gate 24 left open. When the product position sensor 27 detects that the separated foamed piece F' on the conveyor 10' has reached a specified position, the conveyor 10' stops, and the inlet gate 24 is closed, thus not only separating the foamed piece F' but also shutting if off rom the preceding process steps.

Thus the portion of the reduced pressure zone surrounding the foamed piece F', i.e., the pressure restoring compartment or chamber 19, is shut off from the other portion thereof, namely, the vacuum chamber 11, forming a completely independent reduced pressure zone.

After the inlet gate position sensor 26 detects that the inlet gate 24 has been closed, the vacuum breaker valve 22 is opened to change the pressure restoring compartment or chamber 19 from the reduced pressure condition to a normal pressure, i.e. atmospheric, condition. The outlet gate 25 is opened upon the reduced pressure sensor 32 detecting that the pressure restoring compartment or chamber 19 has reached the atmospheric pressure condition. The foamed piece F' is transferred from the compartment or chamber 19 onto the table 29 by the operation of the conveyor 10'. The outlet gate 25 returns to its closed position again upon the delivery sensor 30 detecting the transfer of the foamed piece F'. After the outlet gate position sensor 28 has detected the outlet gate 25 in the closed position, the vacuum breaker valve 22 is closed, and the vacuum pump for the pressure restoring compartment operates, with the result that the compartment or chamber 19 is restored to and maintained at the desired reduced pressure level by a balance between the amount of gas discharged through the gas vent 20 and the amount of air admitted via the pressure control valve 21.

After the reduced pressure sensors 31 and 32 detect that the reduced pressure level in the pressure restoring compartment or chamber 19 has become equivalent to that in the vacuum chamber 11, the inlet gate 24 is returned to its open position again, bringing the pressure restoring compartment or chamber 19 into communication with the vacuum chamber 11 thus completing a pressure cycle for the chamber 19. Consequently the foamed piece F' is discharged from the compartment while the vacuum chamber 11 is being maintained in the vacuum.

Figure 2:
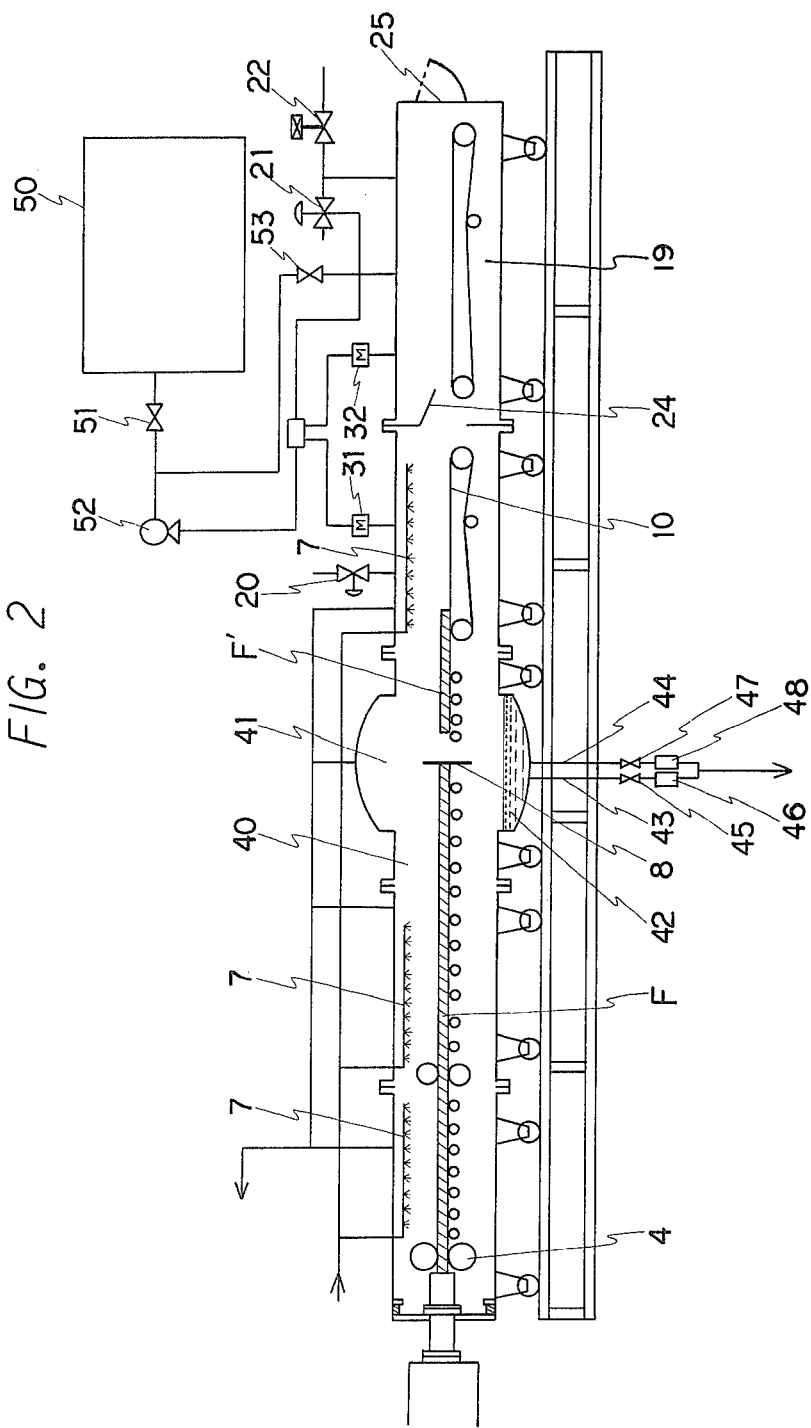

FIG. 2 shows another preferred embodiment of the invention. In FIG. 2 the same numerals and symbols as those in FIG. 1 designate the same portions as those in FIG. 1.

The chamber 11 according to the embodiment consists of separate sections and is fabricated by assembling the separate sections with each other by means of a flange. Each separate section includes at least one powered part for movement of the extrudate or foamed pieces or for operation of the cutter, whereby maintenance of the powered parts can be effected with ease.

A section 40 including the cutter 8 has an enlarged portion 41 in its center. The bottom of the enlarged portion 41 defines a sump 42 for the cooling water containing saw dust and particles. With the sump 42 two lines 43 and 44 are communicated to discharge the cooling water. The line 43 has a valve 45 and a screen 46, and the line 44 has a valve 47 and a screen 48. The lines 43 and 44 are joined together at the downstream of the screens 46 and 48 to form an ejector for the cooling water.

The operation of the ejector can be achieved according to the following procedures. At first, the valve 45 of the line 43 is opened and the valve 47 of the line 44 is closed. In this connection the cooling water passes through the screen 46 and the saw dust and particles in the cooling water are filtered with the screen 46. When the ability of the screen 46 is lowered, the valve 45 is closed and the valve 47 is opened. In this connection the cooling water passes through the line 44 and the saw dust and particles are filtered with the screen 48, during which the screen 46 is cleaned. By repeating these procedures the cooling water can be discharged from the chamber 11 and cleaned.

In the embodiment, the water applicator ducts 7 are provided not only in front of the cutter 8 but in the rear of the cutter 8, that is, above the conveyor 10. When the foamed piece F' is additionally cooled in the rear of the cutter 8, the foamed extrudate does not need to be completely cooled and hardened in front of the cutter 8. This is advantageous to make the apparatus compact and to shorten the operation time.

The foamed piece or cut length F' is transferred to the compartment or chamber 19 by means of the conveyor 10. The pressure in the compartment or chamber 19 alternates according to the pressure cycle. Namely, the foamed piece or cut length F' is transferred into the chamber 19 during the reduced pressure portion of the pressure cycle, and the foamed piece or cut length F' exits out of the chamber 19 during the atmospheric pressure portion of the cycle. Therefore the cut length must be transferred into the chamber 19 every completion of the pressure cycle.

The retention time of the cut length in the chamber 19, namely, the time to be required for completing one pressure cycle can be obtained by controlling a transferring speed of the foamed piece F' by means of the conveyor 10 greater than a drawing speed of the foamed extrudate F by means of the take-up unit 4. For instance, when the time for completing one pressure cycle is about 16 seconds, the drawing speed of the foamed extrudate by means of the take-up unit 4 is 6 m/min, the distance from the cutter 8 to the inlet gate 24 is about 6 m, the time interval of the cutting operation is 20 seconds and the cutting length of the foamed piece F' is about 2 m, the transferring speed of the conveyor 10 is controlled into about 6 m/min.

The reduced pressure portion of the cycle may be preferably produced with a system using a surge tank 50. The surge tank 50 is connected to a vacuum pump 52 through a valve 51, and the vacuum pump 52 is connected to the chamber 19 through a valve 53.

The system is operated by closing the gate 25 and the vacuum breaker valve 22, and then opening the valves 51 and 53. The pressure in the surge tank 50 is previously reduced. In such operation, the atmospheric pressure in the chamber 19 immediately results in a reduced pressure. The precise regulation of the pressure difference between the first chamber 11 and the second chamber 19 is effected by driving the vacuum pump 52 or opening the pressure control valve 21 depending on the pressure difference detected by the reduced pressure sensors 31 and 32. When the pressure between the first chamber 11 and the second chamber 19 come to equivalency, the valve 53 is closed. During the continuing atmospheric portion of the pressure cycle the pressure in the surge tanks 50 is reduced by means of the vacuum pump 52.

In the system, it is preferable that a volume of the surge tank 50 is almost equal to that of the chamber 19 and the final reduced pressure of the surge tank 50 is about a half of the pressure of the first chamber.

Employment of this system using the surge tank 50 can make the pressure cycle shorten.

Most preferably, the apparatus is so designed that the inlet and outlet gate opening and closing movement, generation, adjustment and breaking of the vacuum in the pressure restoring compartment, and transport of the foamed piece into and out of the compartment are effected by power sources provided for these operations, by automatically actuating the power sources according to the foregoing program in response to the detecting signals from the sensors for individually detecting the positions of the foamed piece inside and outside the pressure restoring compartment, the positions of the inlet and outlet gates and the reduced pressure levels of the pressure restoring compartment and the vacuum chamber.

By repeating the foregoing sequence of operations, a desired foamed product having an optional shape and an optional expansion ratio can be prepared at a reduced pressure continuously, stably and industrially advantageously.

The thermoplastic synthetic resins to be used for the process of the invention are not particularly limited but include various homopolymers and copolymers. A wide variety of polymers are usable which include, for example, homopolymers of the polyolefin type, polystyrene type, polyvinyl chloride type, etc. and graft, random or block copolymers, etc. Of these, especially suitable are polyethylene, polypropylene, polystyrene, acrylonitrilestyrene copolymer, acrylonitrile-butadiene-styrene copolymer, ethylene-vinyl acetate copolymer, polyvinyl chloride, etc.

Useful blowing agents are not limited either. Especially suitable are compounds which are in the form of gas or liquid in the normal state, such as methane, ethane, propane, butane, isobutane, pentane, hexane, methyl chloride, methyl fluoride, methylene chloride, dichlorodifluoromethane, trichloromonofluoromethane and dichlorotetrafluoroethane, thermally decomposable blowing agents, such azodicarbonamide, azobisisobutyronitrile, sodium bicarbonate and ammonium carbonate, etc.

According to the process of the invention described in detail, all the steps of extrusion foaming, cooling-hardening and cutting are carried out in a reduced pressure zone, giving a product with an increased expansion ratio, with use of a reduced amount of blowing agent and at a lower cost. Because the reduced pressure acts on the entire surface of the polymer extrudate isotropically and uniformly, a foamed body can be obtained which has uniform cells in its entirety and an excellent quality free of deformation, irrespective of the shape of the body, e.g., of whether it is hollow or tubular. The process has another advantage of being amenable to changes in specifications since the expansion ratio is variable by suitably adjusting the reduced pressure level. Furthermore, the cooling method of contacting the foamed body with cooling water for hardening, although used in the reduced pressure zone, achieves an exceedingly higher cooling efficiency that the conventional method which resorts to the transfer of heat by indirect cooling and radiation of heat. The method therefore serves to greatly reduce the space needed for cooling and remarkably improves the dimensional accuracy of the cross sectional profile of the foamed body. Further because foamed pieces can be discharged in succession without breaking the vacuum for the expansion molding step, the present process permits a continuous operation, achieves a greatly increased operation efficiency when practiced automatically under programmed control and affords a product of stabilized quality due to the fact that the vacuum for the expansion molding step can be maintained at a constant value at all times. Thus the present invention contributes a great deal to the art concerned by successfully reframing the concept of the prior art and materially remedying the problems thereof.

The process of the invention will be described with reference to the following example.

EXAMPLE

Polystyrene pellets were kneaded in a two-screw extruder at a cylinder temperature of 180° C. to 230° C. Trichloromonofluoromethane was injected into the polystyrene at a midportion of the cylinder in a ratio of 6% by weight based on the resin. The polystyrene composition thus made foamable was extruded from the die of the extruder into a vacuum chamber such as the one shown at an extrusion temperature of 130° C. and extrusion pressure of 80 kg/cm$^2$. The vacuum chamber was maintained at a reduced pressure of about 350 mm Hg. The extrudate foamed rapidly and uniformly within the reduced pressure zone, molded by a sizing die into a hollow tube 120 mm in outside diameter and 80 mm in inside diameter and withdrawn by a take-up unit under tension. The foamed body was brought into contact with cooling water having a temperature of 12° C. and sprinkled from an overlying water applicator duct and was thereby cooled for hardening while being further tensioned longitudinally thereof by tensin rolls.

Subsequently the foamed body was cut by a rotary saw cutter to a foamed piece 800 mm in length.

The foamed piece was further transported into a pressure restoring compartment, which was then shut off from the vacuum chamber. After the air pressure in the compartment was restored to the atmospheric pressure, the foamed piece was discharged from the compartment through an outlet gate.

The polystyrene foamed body obtained had a beautiful smooth surface, an expansion ratio of about 38 times and closed cells as uniformly distributed over the entire section.

I claim:

1. A process for producing a foamed resin body comprising the steps of continuously extruding a foamable resin from an extruder into a reduced pressure zone, subjecting the extrudate to an expansion molding step, a cooling-hardening step, characterized by cutting the extrudate to obtain a foamed piece of predetermined length and separating the foamed piece of predetermined length from the preceding process steps when it has reached a specified position and restoring the foamed piece to a normal pressure, and subsequently discharging it to atmosphere.

2. A process as set forth in claim 1 wherein the resin is subjected to the expansion molding step by being foamed and sized to desired dimensions within a sizing die and being thereafter drawn by a take-up unit.

3. A process as set forth in claim 1 wherein the cooling-hardening step comprises contacting the foamed body with cooling water while tensioning the body longitudinally thereof.

4. A process as set forth in claim 1 wherein the step of separating is obtained by inserting the foamed piece of predetermined length to a second zone which may be opened and closed both to the first zone and atmosphere.

5. A process as set forth in claim 4 including the steps of cycling the pressure of the second zone between that of the first mentioned zone and atmosphere.

6. A foam extrusion apparatus comprising a chamber at reduced pressure into which an extrudate is extruded to form a continuous length of foamed extrudate, characterized by means operative to cut the extrudate to length within said chamber, and means then to pass the cut length into a second chamber also at such reduced pressure, and means to cause the cut length to exit the second chamber without affecting the reduced pressure within the first mentioned chamber.

7. Apparatus as set forth in claim 6 including means to cycle the pressure in said second chamber between such reduced pressure and atmospheric pressure.

8. Apparatus as set forth in claim 7 wherein said means then to pass the cut length into said second chamber is operative at the reduced pressure portion of the cycle.

9. Apparatus as set forth in claim 7 wherein said means to cause the cut length to exit the second chamber is operative at the atmospheric pressure portion of the cycle.

10. Apparatus as set forth in claim 7 including sealed gates interconnecting the first mentioned and second chamber, and the second chamber to atmosphere.

11. Apparatus as set forth in claim 10 wherein the sealed gate between the first and second chambers is opened during the reduced pressure portion of the cycle.

12. Apparatus as set forth in claim 11 wherein the sealed gate between the second chamber and atmosphere is opened during the atmospheric pressure portion of the cycle.

13. Apparatus as set forth in claim 10 wherein said gates open alternately in response to the pressure cycle in the second chamber.

14. Apparatus as set forth in claim 13 wherein the portion of the cycle from reduced pressure to atmospheric pressure is initiated in response to the closing of the gate between the first and second chambers.

15. Apparatus as set forth in claim 13 wherein the portion of the cycle from atmospheric pressure to reduced pressure is initiated in response to closing of the gate between the second chamber and atmosphere.

16. Apparatus as set forth in claim 11 wherein said gates close alternately in response to the position of a cut length moving through said second chamber.

17. Apparatus as set forth in claim 16 including powered conveyor means for moving a cut length through said second chamber, and means responsive to the position of said gates for operating said conveyor means.

18. Apparatus as set forth in claim 17 including powered take-up unit for drawing the foamed extrudate and powered conveyor means for transferring the cut length to the second chamber in the first chamber.

19. Apparatus as set forth in claim 18 wherein the transferring speed of the powered conveyor means in the first chamber is greater than the drawing speed of the powered take-up unit.

20. Apparatus as set forth in claim 16 wherein the reduced pressure in the second chamber is generated by communicating the second chamber with a vacuum surge tank provided outside the second chamber.

21. Apparatus as set forth in claim 20 wherein the volume of the surge tank is almost the same as that of the second chamber, and the pressure in the surge tank is about half of the pressure in the first chamber.

22. Apparatus as set forth in claim 6 wherein said first chamber consists of separate sections, and each of the separate sections includes a part for movement.

23. Apparatus as set forth in claim 22 wherein the section including the means operative to cut the extrudate to length has an enlarged portion at its center.

24. Apparatus as set forth in claim 23 including means operative to cool the extrudate with cooling water.

25. Apparatus as set forth in claim 24 wherein said means operative to cool the extrudate are provided both in front of and in rear of the means operative to cut the extrudate to length.

26. Apparatus as set forth in claim 25 wherein the bottom portion of the enlarged portion defines a sump for cooling water containing dust or particles.

27. Apparatus as set forth in claim 26 wherein the sump is connected to an ejector for discharging the cooling water and separating the dust or particles.

28. An extrusion apparatus for forming foamed boards, billets and the like comprising an extruder, a vacuum chamber, extrusion processing means within the vacuum chamber, and a bulkhead between the extruder and processing means closing and sealing an end of the vacuum chamber, and means to move said vacuum chamber toward and away from the bulkhead to open the chamber to provide access to said processing means.

29. Apparatus as set forth in claim 28 including a base for said chamber, and wheel means supporting said chamber on said base.

30. Apparatus as set forth in claim 29 including a pressure restoring compartment joined to said chamber.

31. Apparatus as set forth in claim 29 including power means for said wheel means operative to rotate said wheel means thus to move said chamber.

32. Apparatus as set forth in claim 29 including fixing means to secure the chamber to the base when the apparatus is in operation.

33. A foam extrusion apparatus including a chamber at reduced pressure into which a foamable extrudate is extruded and in which it expands, characterized in that the extrudate is cut to length in said chamber and that a second contiguous chamber is provided which cyclically alternates between such reduced and atmospheric pressure, and means to transfer the cut length from the first mentioned chamber to the second chamber when the latter is in the reduced pressure portion of the cycle, and from the second chamber to atmosphere when the latter is in the atmosphere portion of the cycle.

34. Apparatus as set forth in claim 2 wherein the reduced pressure in the second chamber is generated by communicating the second chamber with a vacuum surge tank provided outside the second chamber.

35. Apparatus as set forth in claim 33 wherein the volume of the surge tank is approximately the same as that of the second chamber, and the pressure in the surge tank is about a half of the pressure in the first mentioned chamber.

36. Apparatus as set forth in claim 1 wherein said first mentioned chamber consists of separate sections and each of the separate sections is mounted for movement together or as a unit.

37. Apparatus as set forth in claim 36 wherein the section including the means operative to cut the extrudate to length has an enlarged portion at its center.

38. Apparatus as set forth in claim 37 including means operative to cool the extrudate with cooling water.

39. Apparatus as set forth in claim 38 wherein said means operative to cool the extrudate are provided both in front of and in the rear of the means operative to cut the extrudate to length.

40. Apparatus as set forth in claim 39 wherein the bottom portion of the enlarged portion defines a sump for cooling water containing dust or particles.

41. Apparatus as set forth in claim 40 wherein the sump is connected to an ejector for discharging the cooling water and separating the dust or particles.

42. Apparatus as set forth in claim 41 wherein the sump is connected to an ejector for discharging the cooling water and separating the dust or particles.

* * * * *